US012786500B2

(12) United States Patent
Malhotra

(10) Patent No.: US 12,786,500 B2
(45) Date of Patent: Nov. 3, 2026

(54) CREATING LOCALIZED WIRELESS NETWORK ZONES FOR PASSENGERS ON COMMERCIAL PASSENGER VEHICLES

(71) Applicant: Panasonic Avionics Corporation, Irvine, CA (US)

(72) Inventor: Jaideep Malhotra, Crystal Lake, IL (US)

(73) Assignee: Panasonic Avionics Corporation, Irvine, CA (US)

( * ) Notice: Subject to any disclaimer, the term of this patent is extended or adjusted under 35 U.S.C. 154(b) by 10 days.

(21) Appl. No.: 19/096,379

(22) Filed: Mar. 31, 2025

(65) Prior Publication Data

US 2025/0227319 A1 Jul. 10, 2025

Related U.S. Application Data

(62) Division of application No. 18/169,083, filed on Feb. 14, 2023, now Pat. No. 12,267,546.

(51) Int. Cl.
*H04N 21/414* (2011.01)
*H04N 21/472* (2011.01)

(52) U.S. Cl.
CPC . *H04N 21/41422* (2013.01); *H04N 21/47217* (2013.01)

(58) Field of Classification Search
CPC .................. H04N 21/41422; H04N 21/47217
See application file for complete search history.

(56) References Cited

U.S. PATENT DOCUMENTS 6,404,388 B1 6/2002 Sollenberger et al.
7,483,696 B1 1/2009 Mitchel
(Continued)

FOREIGN PATENT DOCUMENTS

CA 3074959 A1 9/2020
CN 116634399 A 8/2023
(Continued)

OTHER PUBLICATIONS

Extended European Search Report from European Patent Application No. 23156789.2 dated Jun. 20, 2023 (11 pages).
(Continued)

*Primary Examiner* — Sumaiya A Chowdhury
(74) *Attorney, Agent, or Firm* — Ashurst Perkins Coie US LLP

(57) ABSTRACT

A system for creating a localized wireless network zone for a passenger on a commercial passenger vehicle is provided. The system comprises: a first media playback device and a second media playback device that are respectively disposed on a first passenger seat and a second passenger seat in the commercial passenger vehicle, each of the first media playback device and the second media playback device operable as a seat hotspot by creating a localized wireless network zone covering passenger seats located in a vicinity of the first passenger seat and the second passenger seat, respectively; and an onboard server communicatively coupled to the first media playback device and the second media playback device and configured to monitor a number of requests for a wireless connection in the commercial passenger vehicle and control at least one of the first media playback device and the second media playback device to turn on the seat hotspot based on a result of the monitoring.

20 Claims, 12 Drawing Sheets

(56) References Cited

U.S. PATENT DOCUMENTS

| | | | | |
|---|---|---|---|---|
| 7,496,361 | B1 | 2/2009 | Mitchel | |
| 7,565,143 | B2 | 7/2009 | Takeuchi et al. | |
| 7,620,364 | B2 | 11/2009 | Higashida et al. | |
| 8,886,247 | B1 | 11/2014 | Price et al. | |
| 12,035,255 | B2 | 7/2024 | Malhotra | |
| 12,035,424 | B2 | 7/2024 | Malhotra | |
| 2004/0098745 | A1 | 5/2004 | Marston et al. | |
| 2005/0170783 | A1 | 8/2005 | Krishnan et al. | |
| 2008/0013601 | A1 | 1/2008 | Lind et al. | |
| 2009/0052386 | A1 | 2/2009 | Higashida | |
| 2009/0096857 | A1 | 4/2009 | Frisco et al. | |
| 2009/0100476 | A1 | 4/2009 | Frisco et al. | |
| 2009/0288123 | A1 | 11/2009 | Havlovick et al. | |
| 2010/0216457 | A1 | 8/2010 | Ezaki et al. | |
| 2010/0231451 | A1 | 9/2010 | Noguchi et al. | |
| 2010/0235866 | A1 | 9/2010 | Jangid | |
| 2011/0128949 | A1 | 6/2011 | Ezaki et al. | |
| 2011/0219408 | A1 | 9/2011 | Frisco et al. | |
| 2011/0244890 | A1 | 10/2011 | Lehmann et al. | |
| 2012/0030708 | A1* | 2/2012 | Margis | B64D 11/0624 725/38 |
| 2013/0074108 | A1 | 3/2013 | Cline et al. | |
| 2014/0013365 | A1 | 1/2014 | Ezaki et al. | |
| 2014/0372775 | A1 | 12/2014 | Li et al. | |
| 2015/0128193 | A1 | 5/2015 | Frisco et al. | |
| 2015/0304857 | A1* | 10/2015 | Hong | H04W 16/18 370/254 |
| 2016/0004876 | A1 | 1/2016 | Bye et al. | |
| 2016/0095045 | A1 | 3/2016 | Salomon et al. | |
| 2017/0126068 | A1 | 5/2017 | Greig et al. | |
| 2017/0243485 | A1 | 8/2017 | Rubin et al. | |
| 2018/0167644 | A1 | 6/2018 | Frisco et al. | |
| 2019/0052294 | A1 | 2/2019 | Abdelmonem | |
| 2019/0068718 | A1 | 2/2019 | Lee | |
| 2019/0090174 | A1 | 3/2019 | Rocci et al. | |
| 2019/0098478 | A1 | 3/2019 | Rabii et al. | |
| 2019/0149611 | A1 | 5/2019 | Mueller et al. | |
| 2019/0253980 | A1* | 8/2019 | Rabii | H04W 4/023 |
| 2019/0266479 | A1 | 8/2019 | Singh et al. | |
| 2019/0297585 | A1 | 9/2019 | Barnes et al. | |
| 2019/0315484 | A1 | 10/2019 | Lauer | |
| 2020/0160729 | A1 | 5/2020 | Epelbaum | |
| 2020/0339266 | A1 | 10/2020 | McMillan | |
| 2021/0075521 | A1 | 3/2021 | Bolotski | |
| 2022/0104289 | A1* | 3/2022 | Bates | H04W 12/069 |
| 2022/0312181 | A1 | 9/2022 | Sumien et al. | |
| 2022/0377640 | A1 | 11/2022 | Tonnerre et al. | |
| 2023/0146142 | A1 | 5/2023 | Malhotra | |
| 2023/0147344 | A1 | 5/2023 | Malhotra | |
| 2023/0269597 | A1 | 8/2023 | Malhotra | |
| 2024/0188182 | A1 | 6/2024 | Ying et al. | |

FOREIGN PATENT DOCUMENTS

| | | | |
|---|---|---|---|
| CN | 118369904 | A | 7/2024 |
| CN | 118383079 | A | 7/2024 |
| EP | 2632208 | B1 | 5/2018 |
| EP | 3859372 | A1 | 8/2021 |
| EP | 4230525 | A1 | 8/2023 |
| EP | 4418702 | A2 | 8/2024 |
| EP | 4430817 | A1 | 9/2024 |
| EP | 4430916 | A1 | 9/2024 |
| WO | 2020140983 | A1 | 7/2020 |
| WO | 2023086811 | A1 | 5/2023 |
| WO | 2023086813 | A1 | 5/2023 |

OTHER PUBLICATIONS

International Search Report and Written Opinion from International Application No. PCT/US2022/079529 dated Mar. 3, 2023 (13 pages).

International Search Report and Written Opinion from International Application No. PCT/US2022/079531 dated Mar. 22, 2023 (14 pages).

Partial European Search Report from European Patent Application No. 24156897.1 dated Jul. 2, 2024 (15 pages).

* cited by examiner

CREATING LOCALIZED WIRELESS NETWORK ZONES FOR PASSENGERS ON COMMERCIAL PASSENGER VEHICLES

CROSS-REFERENCE TO RELATED APPLICATIONS

This application is a divisional of U.S. patent application Ser. No. 18/169,083, filed Feb. 14, 2023. The content of the foregoing application is incorporated herein in its entirety by reference.

TECHNICAL FIELD

This document is generally related to systems, methods, and apparatus to improve passenger experiences for passengers in commercial passenger vehicles such as airplanes, passenger trains, buses, cruise ships, and other forms of transportation.

BACKGROUND

Commercial travel has evolved with the increasing popularity of personal electronic devices (PEDs) that passengers carry on board, as well as media play devices provided in commercial passenger vehicles. Techniques that provide passengers in commercial passenger vehicles access to a large variety of entertainment content with minimal or no disruption will enhance a positive travel experience.

SUMMARY

This patent document describes, among other things, various implementations for creating localized wireless network zones for passengers on commercial passenger vehicles.

In one aspect, a system for creating a localized wireless network zone for a passenger on a commercial passenger vehicle is provided. The method comprises: a first media playback device and a second media playback device that are respectively disposed on a first passenger seat and a second passenger seat in the commercial passenger vehicle, each of the first media playback device and the second media playback device operable as a seat hotspot by creating a localized wireless network zone covering passenger seats located in a vicinity of the first passenger seat and the second passenger seat, respectively; and an onboard server communicatively coupled to the first media playback device and the second media playback device and configured to monitor a number of requests for a wireless connection in the commercial passenger vehicle and control at least one of the first media playback device and the second media playback device to turn on the seat hotspot based on a result of the monitoring.

In another aspect, a method for creating a localized wireless network zone for a passenger on a commercial passenger vehicle is provided. The method comprises: monitoring, by an onboard server located in the commercial passenger vehicle, a request for a wireless connection from a first passenger on the commercial passenger vehicle; checking whether the request for the wireless connection meets one of predetermined conditions; and instructing a first media playback device disposed on a first passenger seat associated with the first passenger to create a wireless network zone covering an area including the passenger seat, the wireless network zone having an identifier that is selectively broadcast to other passengers in the commercial passenger vehicle depending on a result of the checking.

In another aspect, a computer readable medium is provided. The computer readable medium stores instructions, upon execution by a processor, causing the processor to implement a method comprising: monitoring, by an onboard server located in a commercial passenger vehicle, a request for a wireless connection from a first passenger on the commercial passenger vehicle; checking whether the request for the wireless connection meets one of predetermined conditions; and instructing a first media playback device disposed on a first passenger seat associated with the first passenger to create a wireless network zone covering an area including the passenger seat, the wireless network zone having an identifier that is selectively broadcast to other passengers in the commercial passenger vehicle depending on a result of the checking.

The above and other aspects and their implementations are described in greater detail in the drawings, the description, and the claims.

DETAILED DESCRIPTION

Figure 1:
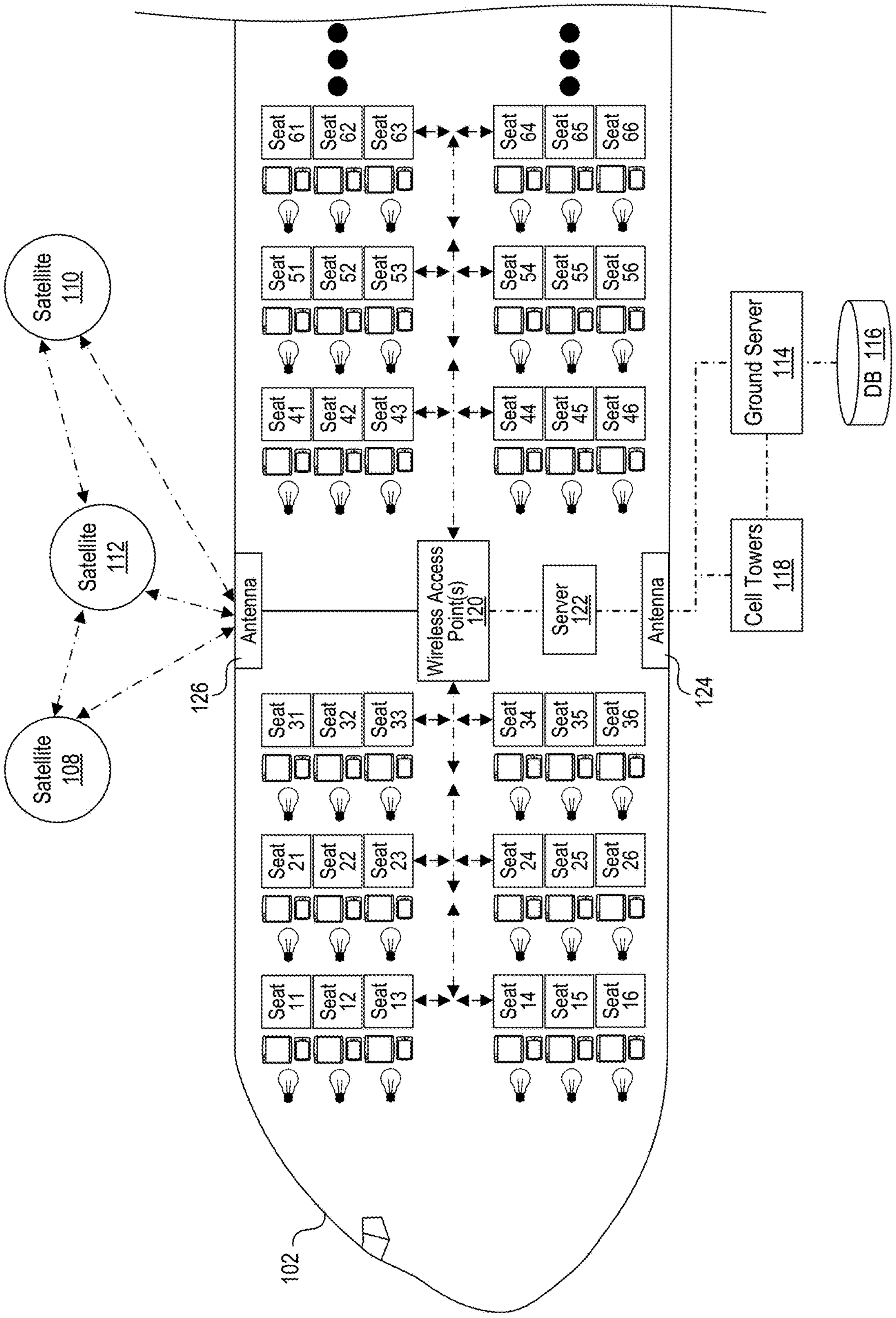
FIG. 1 shows an example of an in-flight entertainment (IFE) system installed in an airplane based on some implementations of the disclosed technology.

Recent advances in wireless technologies have made wireless connection services such as on-board Wi-Fi or Bluetooth connections available during travel in a commercial passenger vehicle such as an airplane or train. Unlike the past when a passenger was not provided with wireless connection services onboard during travel, onboard wireless connection services are available in many commercial vehicles so that passengers can share their trips on social media and business travelers can use their flight time more productively. While the commercial passenger vehicle is provided with limited resources to support wireless connectivity for the passengers, as more passengers use wireless connection services in the commercial passenger vehicle and there are more wireless devices carried by the passengers, for example, PEDs, other ancillary wireless devices, undesired circumstances can be caused. For example, unsuccessful connection issues due to network congestion and unavailable slots can result in poor signal qualities, which negatively affects passenger experiences for the travel and productivity and connection capabilities during travel.

A conventional access layout in an airplane uses wireless access points (WAPs) to provide the wireless connections to passenger devices in the cabin. The WAPs are installed in a ceiling or overhead areas of an airplane to provide radio signals for passengers located in corresponding areas of the airplane. Each wireless access point provides a wireless access zone as a part of a communication network using radio frequency (RF) transmissions and covers from 10 to 30 rows of seats. The wireless connections provided by WAPs, however, are affected by many factors such as ranges, passengers in the cabin, and luggage in overhead areas. With these factors causing undesired impacts, WAPs do not always meet the actual usage and coverage in the cabin as expected. In addition, each WAP adds weights which are crucial to the moving vehicle such as flying airplane. The maintenance of WAPs is not convenient and requires labor, time, and equipment to replace a WAP when a WAP fails. Also, the replacement of the WAP can cause the disruption of the wiring in the vehicle, which can result in the electrical malfunction of the electrical wiring interconnect system. In addition, there exist the operational limitations on the WAPs from the technical specifications (e.g., Wi-Fi specifications). For example, the number of slots broadcast on the channels (e.g., 2.4 Ghz and 5 Ghz) without impacting the bandwidth and the QOS (quality of service) is also limited.

In light of the recognition of the issues existing in the conventional wireless connectivity system with WAPs, the implementations of the disclosed technology provide creating localized wireless network zones utilizing the media playback devices disposed on the passenger seats. In some implementations, the media playback devices are equipped with a wireless module having capabilities to operate as the seat hotspots to connect passengers' wireless devices to the wireless network within the vehicle. In some implementations, the techniques for configuring the seat hotspots using the media playback devices can be implemented together with WAPs installed in the airplane to alleviate the issues involved with WAPs. Some implementations of the disclosed technology create localized and adjustable wireless network zones during the travel based on, for example, demands for wireless connections from passengers, etc. In addition, some implementations of the disclosed technology create wireless network zones for qualifying passengers such that those qualifying passengers can enjoy improved security and more stable wireless connection services.

The technical solutions described in the present document can be embodied in implementations to improve a passenger experience among other features by improving wireless connectivity within the commercial passenger vehicle. With various examples of the disclosed technology, it is possible to provide a more reliable connectivity to a passenger during travel, which can increase passenger experience while they stay in the vehicle. Various implementations will be discussed in detail with reference to the figures below. In the description, an airplane is described as an example of the passenger vehicle, but the implementations of the disclosed technology can be applicable to other passenger vehicles such as buses, trains, ships, and other types of commercial passenger vehicles.

FIG. 1 shows an example of an in-flight entertainment (IFE) system for passengers in a commercial passenger vehicle such as an airplane. The example diagram of the in-flight system as shown in FIG. 1 is provided to explain how wireless connections are supported in the airplane 102. The components shown as a single element in FIG. 1, e.g., the server 106, the database 116, the wireless access point 120, etc. can be configured in multiple elements. For example, the in-flight service system can include multiple wireless access points to facilitate or support providing of wireless coverages for the passengers.

The IFE system provides various entertainment and connectivity services to passengers on board. Referring to FIG. 1, the IFE system includes a server 106, antenna 126, and antenna 124. The passengers carry their own devices, which include the PEDs (illustrated by the light bulb icon in FIG. 1) and other wireless electronic devices. The PEDs may refer to any electronic computing device that includes one or more processors or circuitries for implementing the functions related to data storage, video and audio streaming, wired communications, wireless communications, etc. The examples of the PEDs include cellular phones, smart phones, tablet computers, laptop computers, and other portable computing devices. In the implementations of the disclosed technology, the PEDs may have the capability to execute application software programs ("apps") to perform various functions.

In FIG. 1, the airplane 102 is depicted to include multiple passenger seats, Seat 11 to Seat 66. The example diagram as shown in FIG. 1 shows the economy seats only but different types of passenger seats (e.g., premium economy class, premium class, first class, etc.) can be further provided in the airplane 102. The media playback devices (illustrated by screen icon) are provided at each passenger seat and configured with capabilities for video and audio streaming, Internet communications, and other capabilities. In some implementations, the media playback devices are provided at each passenger seat, such as located at each of the seatbacks of the passenger seats, and/or on cabin walls and/or deployable from an armrest for seats located at a bulkhead (i.e., in the first row of a section). The media playback devices have displays providing interfaces to each passenger through which each passenger enters their selections on the wireless network option, the entertainment option, the particular selections, emergency requests, etc. To facilitate communications with the passengers, various graphic user interface (GUI) functions can be suggested and displayed on the media playback devices. More details will be further discussed later this document.

In the implementations of the disclosed technology, the media playback devices correspond to wireless enabled devices including wireless modules that support wireless connections. For example, the media playback devices include system-on-chips (SOCs) with wireless modules supporting wireless connections such as Wi-Fi, Bluetooth, etc. With the wireless module, the media playback devices can operate as a seat hotspot by creating a localized wireless network zone that allows the PEDs of the passengers in a corresponding area to be connected to the wireless network in the airplane. In the implementations, the localized wireless network zone created by the media playback device has an adjustable size depending on the transmission configuration of the media playback device. In the implementations of the disclosed technology, the media playback devices communicate with the server 122 such that the server 122 provides control signals to turn on or off the seat hotspot of the media playback devices and the transmission configurations of the media playback devices. In some implementations, the media playback devices, the server, and the PEDs may be in communication through wired connections or wireless connections. In some implementations, the communication among the server 122, the media playback devices 104, and the PEDs are achieved through the antenna 124 to and from the ground-based cell towers 118 by, for example, a provision of network plugs at the seat for plugging PEDs to a wired onboard local area network. In some other implementations, the communications among the server 122, the media playback devices, and the PEDs are achieved through the antenna 126 to and from satellites 108, 110, 112 in an orbit. For example, the wireless network utilizing the wireless module of the media playback devices, and/or the wireless access point 120 can be formed among the server 122, the media playback devices, and the PEDs and allow the communication therebetween.

The server 122 is communicably coupled with media playback devices and the PEDs and configured to perform various operations including those as discussed in later with reference to FIGS. 5, 9-11. In some implementations, the server 122 may communicate with other systems, for example, the ground server 114, which are located outside of the airplane 102 via the antenna 124 for receiving and transmitting information from/to the other systems. In some examples, cell towers 118 communicate or interface with the antenna 124 of the airplane 102, such that other systems, such as the ground server 114 and the database 116 can transmit and receive data with the server 122 and other in-vehicle systems. Thus, the cell tower 118 may act as communication nodes between the antenna 124 of the airplane 102 and the ground server 114 and the databases 116. In some implementations, the server 122 implements a router for the wireless onboard networks and various functionality disclosed herein to provide wireless network zones by utilizing media playback devices. The ground server 114 may be in communication with the database 116 and provide information from the database 116 to the server 122 and store information received from the server 122 in the database 116. Although FIG. 1 shows that the database 116 is provided separately from the ground server 114, the database 116 can be provided as a part of the ground server 114.

Although not shown in FIG. 1, the IFE system may further include a database which stores passenger information, for example, profiles of the passengers (name, age, etc.), preferred entertainment options (movies, music, shows, etc.), preferred entertainment content (e.g., genres of movies), etc. The passenger information can be obtained in multiple manners and is stored in the database of the IFE system. In some implementations, the passenger information is obtained prior to the passengers coming on board (e.g., at the time of purchasing the tickets or checking in for the flights), or at other times. In some implementations, the passenger information can be obtained and shared by an association of several airplane companies and retrieved from the database 116. In some implementations, the passenger information can be updated during the trip. In some implementations, the passenger information can be utilized in providing a personalized local wireless network to a passenger on certain types of the passenger seats (e.g., first class or premium class).

Figure 2:
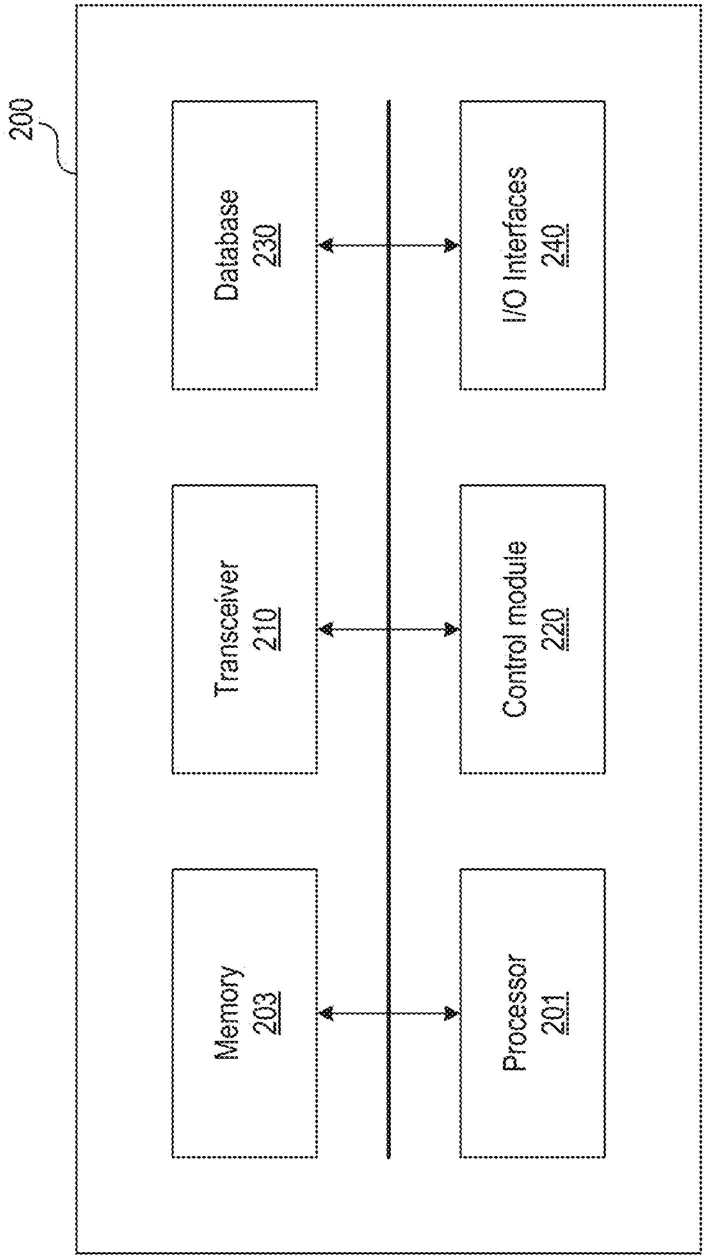
FIG. 2 shows an example block diagram of a computing device based on some implementations of the disclosed technology.

FIG. 2 shows an example block diagram of a computing device (e.g., an onboard server, a media playback device, a PED, or a ground server) based on some implementations of the disclosed technology. The computing device 200 includes at least one processor 201, a memory 203, a transceiver 210, a control module 220, a database 230, and an I/O (input/output) interface 240. In other embodiments, additional, fewer, and/or different elements may be used to configure the computing device 200. The memory 203 may store instructions and applications to be executed by the processor 201. The memory 203 is an electronic holding place or storage for information or instructions so that the information or instructions can be accessed by the processor 201. The memory 203 can include, but is not limited to, any type of random-access memory (RAM), any type of read only memory (ROM), any type of flash memory, such as magnetic storage devices (e.g., hard disk, floppy disk, magnetic strips, etc.), optical disks (e.g., compact disc (CD), digital versatile discs (DVD), etc.), smart cards, flash memory devices, etc. The instructions upon execution by the processor 201 configure the computing device 200 to perform the operations (e.g., the operations as shown in FIGS. 5 and 9-12) which will be described in this patent document. The instructions executed by the processor 201 may be carried out by a special purpose computer, logic circuits, or hardware circuits. The processor 201 may be implemented in hardware, firmware, software, or any combination thereof. The term "execution" is, for example, the process of running an application or the carrying out of the operation called for by an instruction. The instructions may be written using one or more programming language, scripting language, assembly language, etc. By executing the instruction, the processor 201 can perform the operations called for by that instruction.

The processor 201 operably couples with the memory 203, the transceiver 210, the control module 220, the database 230, and the I/O interface 240, to receive, send, and process information and to control the operations of the computing device 200. The processor 201 may retrieve a set of instructions from a permanent memory device, such as a ROM device, and copy the instructions in an executable form to a temporary memory device that is generally some form of RAM. In some implementations, the computing device 200 can include a plurality of processors that use the same or a different processing technology. The transceiver 210 may include a transmitter and a receiver. In some embodiments, the computing device 200 comprises a transmitter and a receiver that are separate from another but functionally form a transceiver. The transceiver 210 transmits or sends information or data to another device (e.g., another server, a PED, etc.) and receives information or data transmitted or sent by another device (e.g., another server, a PED, etc.).

The control module 220 of the computing device 200 is configured to perform operations to assist the computing device 200. In some implementations, the control module 220 can be configured as a part of the processor 201. When the computing device 200 corresponds to the IFE system as shown in FIG. 1, the control module 220 can be included in the airplane 102. In some implementations, the control module 220 can operate machine learning/artificial intelligence (AI) applications that perform various types of data analysis to automate analytical model building. Using algorithms that iteratively learn from data, machine learning applications can enable computers to learn without being explicitly programmed. The machine learning/AI applications may be configured to use data learning algorithms to build models to interpret various data received from the various devices or components to detect, classify, and/or predict future outcomes. Such data learning algorithms may be associated with rule learning, artificial neural networks, inductive logic programming, and/or clustering. In some implementations, the control module 220 may assist the computing device 200 to perceive their environment and take actions that maximize the effectiveness of the operations performed by the computing device 200.

The I/O interfaces 240 enable data to be provided to the computing device 200 as input and enable the computing device 200 to provide data as output. In some embodiments, the I/O interfaces 240 may enable user input to be obtained and received by the computing device 200 (e.g., via a touch-screen display, buttons, switches) and may enable the computing device 200 to display information. In some embodiments, devices, including touch screen displays, buttons, controllers, audio speakers, or others, are connected to the computing device 200 via I/O interfaces 240.

In the implementations of the disclosed technology, the media playback devices can operate as seat hotspots that allow to connect the PEDs disposed on corresponding passenger seats to have wireless coverages. With the media playback devices operating as seat hotspots, the localized wireless network zones can be created to provide the wireless coverage to the PEDs of the passengers on corresponding passenger seats. The wireless network zones created by the media playback devices have sizes that are adjustable based on, for example, the hardware specification of the media playback devices, transmission configuration of the media playback devices, etc. In the example, the wireless network zone created by a particular media playback device covers several passenger seats nearby the particular media playback device. By utilizing the media playback devices as seat hotspots, the passengers on the corresponding passenger seats can have the wireless coverages through the localized wireless network created by the media playback devices, without using wireless access points (WAPs). Thus, it is possible to avoid maintenance issues and operational limitations related to WAPs. In some implementations, the wireless network zones created by the media playback devices support various wireless communication protocols, e.g., Wi-Fi or Bluetooth. In some implementations, the techniques for configuring the seat hotspots using the media playback devices can be implemented together with WAPs installed in the airplane to alleviate the issues involved with WAPs.

Figure 3:
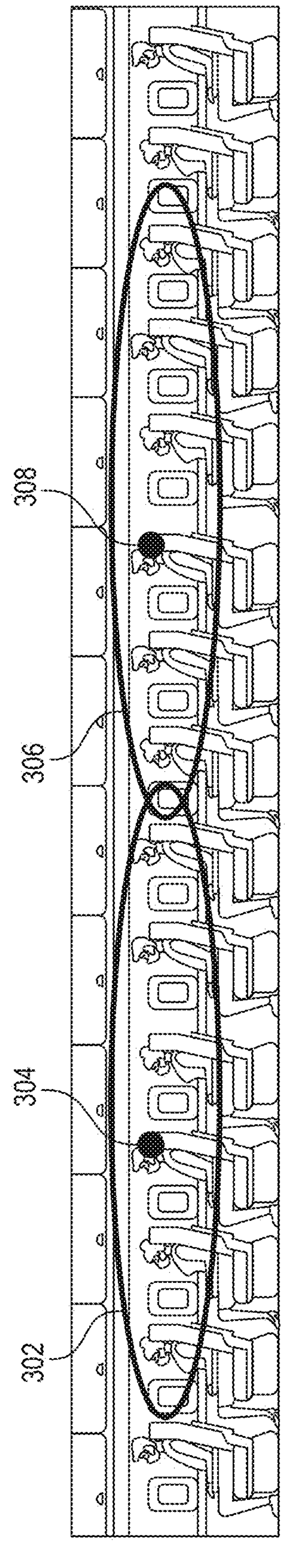
FIG. 3 shows an example view of localized wireless network zones created by utilizing media playback devices based on some implementations of the disclosed technology.

FIG. 3 shows an example view of localized wireless network zones created by utilizing media playback devices based on some implementations of the disclosed technology. In the example, the wireless network zone 302 is created by utilizing the media playback device 304 and the wireless network zone 306 is created by utilizing the media playback device 308. In the example as shown in FIG. 3, the wireless network zones 302 and 306 extend to cover six passenger seats. Covering six passenger seats is the example only and other implementations are also possible. The number of passenger seats covered by the wireless network zones 302 and 306 correspond to the sizes of the wireless network zones 302 and 306 and can be varied based on, for example, the transmission configuration of the media playback devices 304 and 308. In the example of FIG. 3, the wireless network zones 302 and 306 have a same size. In other implementations, the wireless network zones created by media playback devices can have different sizes from one another.

Figure 4:
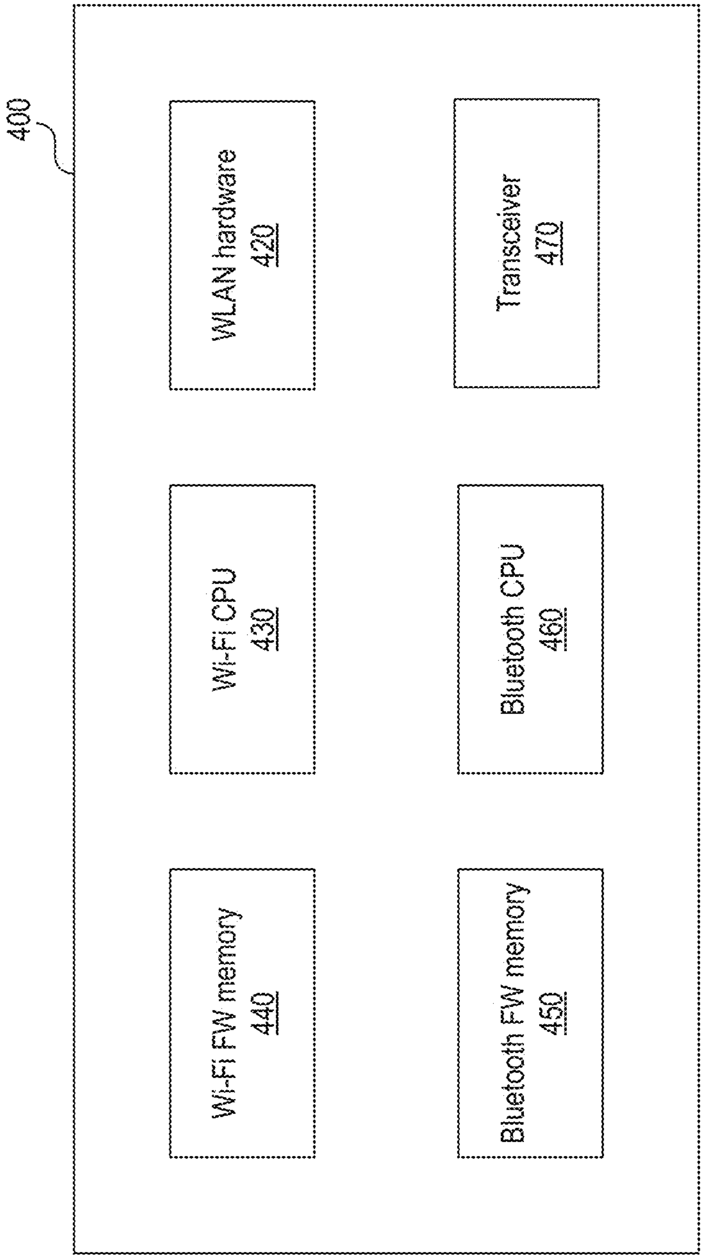
FIG. 4 depicts an example of a schematic diagram of a wireless module of a media playback device based on some implementations of the disclosed technology.

FIG. 4 depicts an example of a schematic diagram of a wireless module of a media playback device based on some implementations of the disclosed technology. In the example as shown in FIG. 4, the wireless module 400 is implemented as a Wi-Fi/Bluetooth SOC that corresponds to an integrated wireless chip including on-chip wireless local area network (WLAN) hardware 420, Wi-Fi central processing unit (CPU) 430, Wi-Fi firmware (FW) memory 440, Bluetooth FW memory 450, Bluetooth CPU 460. In the example of FIG. 4, the elements for Wi-Fi connections and the elements for Bluetooth connections are included in one chip but other implementations are also possible. Thus, the elements for Wi-Fi connections and the elements for Bluetooth connections are implemented as separate chips. For The WLAN hardware 420 can include hardware for enabling wireless communications, which in some implementations can include a baseband and wireless transceiver. The Wi-Fi CPU 430 can include one or more processors configured by instructions stored in a Wi-Fi Firmware (FW) memory 440 to implement the wireless connection process described herein, among other processes. The Bluetooth CPU 460 can include one or more processors configured by instructions stored in a Bluetooth FW memory 450 to implement the wireless connection process described herein, among other processes. The Wi-Fi FW memory 440 and the Bluetooth FW memory 450 can include, for example, operating systems programmed to control operations of the Wi-Fi/Bluetooth SOC. Some implementations of Wi-Fi SOC can include additional on-chip flash memory and/or applications processors. In some implementations, the wireless modules of the media playback devices form a Mesh network, which allows the flexibility and improved coverages. In the example, the wireless module 400 can further include wireless transceivers transmitting transmission signals whose transmission configurations are adjusted during a flight as further discussed in this patent document.

Figure 5:
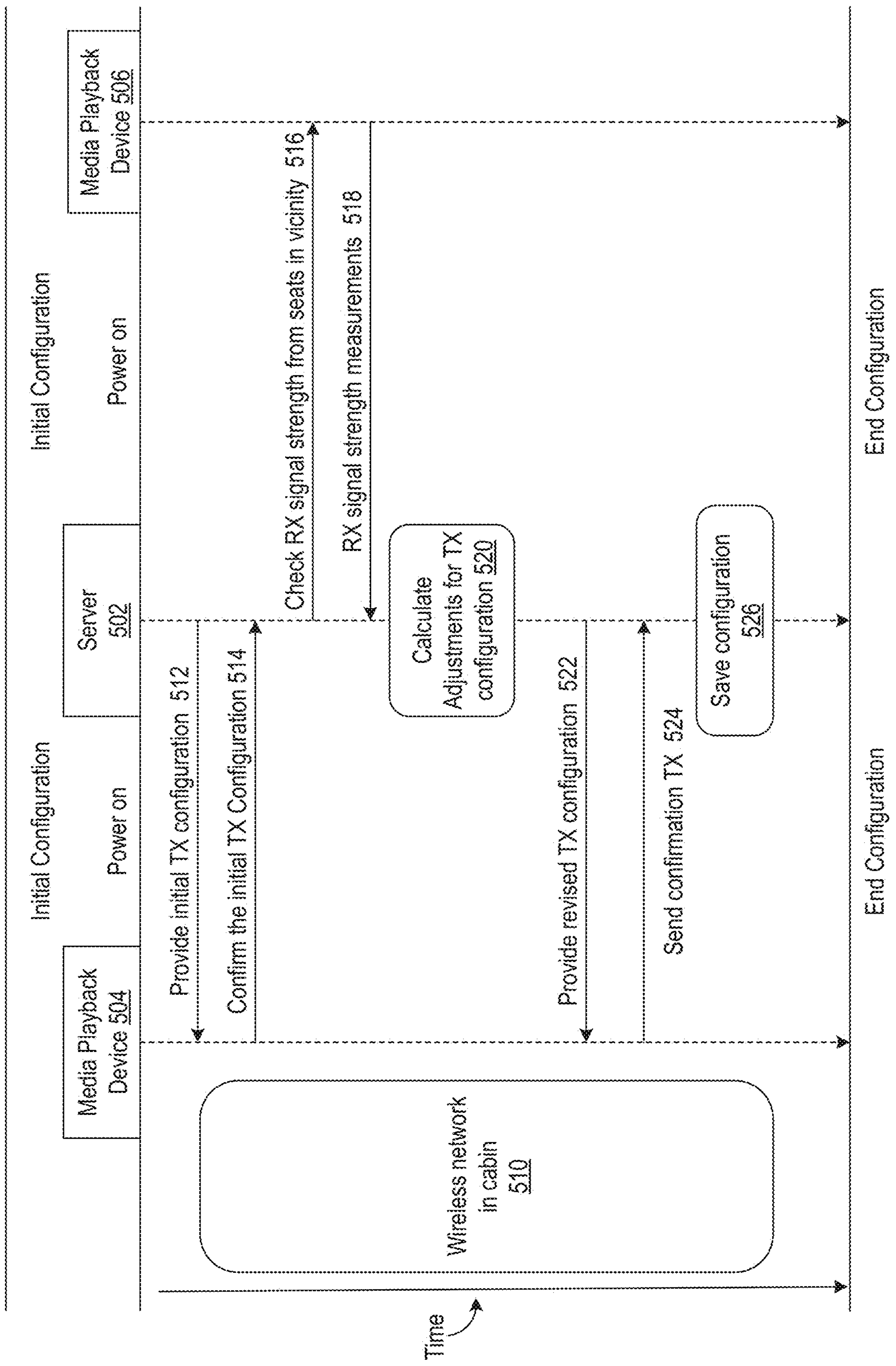
FIG. 5 shows an example flowchart of operations for an initial cabin configuration based on some implementations of the disclosed technology.

FIG. 5 shows an example flowchart of operations for an initial cabin configuration based on some implementations of the disclosed technology. The server 502 may correspond to the server 122 as shown in FIG. 2 and the media playback devices 506 and 506 may be associated with corresponding seats and have capabilities of operating as seat hotspots for creating the wireless network zone. The initial cabin configuration process as shown in FIG. 5 can be performed during a set up process before a flight.

At operation 512, the server 502 provides the initial transmission (TX) configuration to a media playback device 504 provided on a passenger seat. In response to the receipt of the initial transmission (TX) configuration, the wireless module of the media playback device 504 is set up according to the initial transmission (TX) configuration (e.g., transmission signal strength). At operation 514, the media playback device 504 reports, to the server 502, the confirmation of the initial transmission (TX) configuration. At operation 516, the server 502 checks the reception (RX) signal strength with a media playback device 506 provided on another passenger seat located in the vicinity of the first seat. In response to receiving the request from the server 502, at operation 518, the media playback device 506 reports, to the server 502, the reception (RX) signal strength measurements. The RX signal strength measurements may be referred to as the feedback data. At operation 520, the server 502 evaluates the feedback data from the media playback device 506 and calculates the adjustments of the signal strength for the media playback device 504 based on the evaluation. At operation 522, the server 502 provides, to the media playback device 504, the adjusted transmission (TX) configuration. At operation 526, the power level of the transmission signal for the media playback device 504 can be saved as the final initial configuration parameter. The operations 512 to 526 may repeat for each passenger seat.

While FIG. 5 shows one media playback device 504 and one media playback device 506, the multiple media playback devices can receive the initial TX configuration at the same time and the feedback data can be received from the multiple media playback devices at the same time. In some implementations, when the media playback devices turn on the seat hotspot at the start of the flight, the transmission configuration may have values according to the initial configuration parameter.

Some implementations of the disclosed technology provide a variable or dynamic wireless network configuration in the cabin by utilizing the media playback devices having capabilities of operating as seat hotspots. In some implementations, the IFE system controls the media playback devices during the flight to enable or disable the seat hotspots of the media playback devices. The media playback devices are designed to turn on or off their seat hotspots based on the control of the IFE system. When the seat hotspots of the media playback devices are turned on, the media playback devices can create localized wireless network zones. When the seat hotspots of the media playback devices are turned off, the media playback devices do not create localized wireless network zones.

In the implementations, the server monitors conditions of the wireless connectivity within the airplane, e.g., the usage of resources of wireless network, the number of new requests for wireless connections, the number of wireless devices that stop the use of the wireless connections, etc. Based on the monitoring, the server controls the media playback devices to optimize the wireless connectivity in the cabin by turning on additional seat hotspots of the media playback devices to provide localized wireless network zones or by turning off seat hotspots of the media playback devices to cancel the localized wireless network zones. Thus, in the implementations, according to the control from the server, the seat hotspots of some media playback devices are enabled to create the wireless network zones, while the seat hotspots of some other media playback devices are disabled not to create the wireless network zones. With the flexibility of the number of the wireless network zones existing in the airplane, it is possible to adjust the number of slots available in the cabin based on the demands for the wireless connections. This is different from the conventional technologies where the fixed number of slots, e.g., 250 slots, are provided all the time without considering the number of devices to connect. The flexibility of the number of the wireless network zones can allow to optimize the use of the slots in the cabin and reduce the signal interferences. In some implementations, the server may determine which media playback device to turn on the seat hotspot based on the location information associated with the request for wireless connections. In some implementations, the server may determine which media playback device to turn off the seat hotspot based on the location information of a passenger who does not need the wireless connection any longer. In some implementations, a passenger can make a request for a wireless connection or termination of the wireless connection through the media playback device disposed on the passenger seat of the passenger or the app running on his or her electronic device and such request is communicated to the server. The server can identify the location information corresponding to the request for the wireless connection or the termination of the wireless connection and instructs the media playback device to turn on or turn off the seat hotspot based on the location information corresponding to the request.

Figure 6:
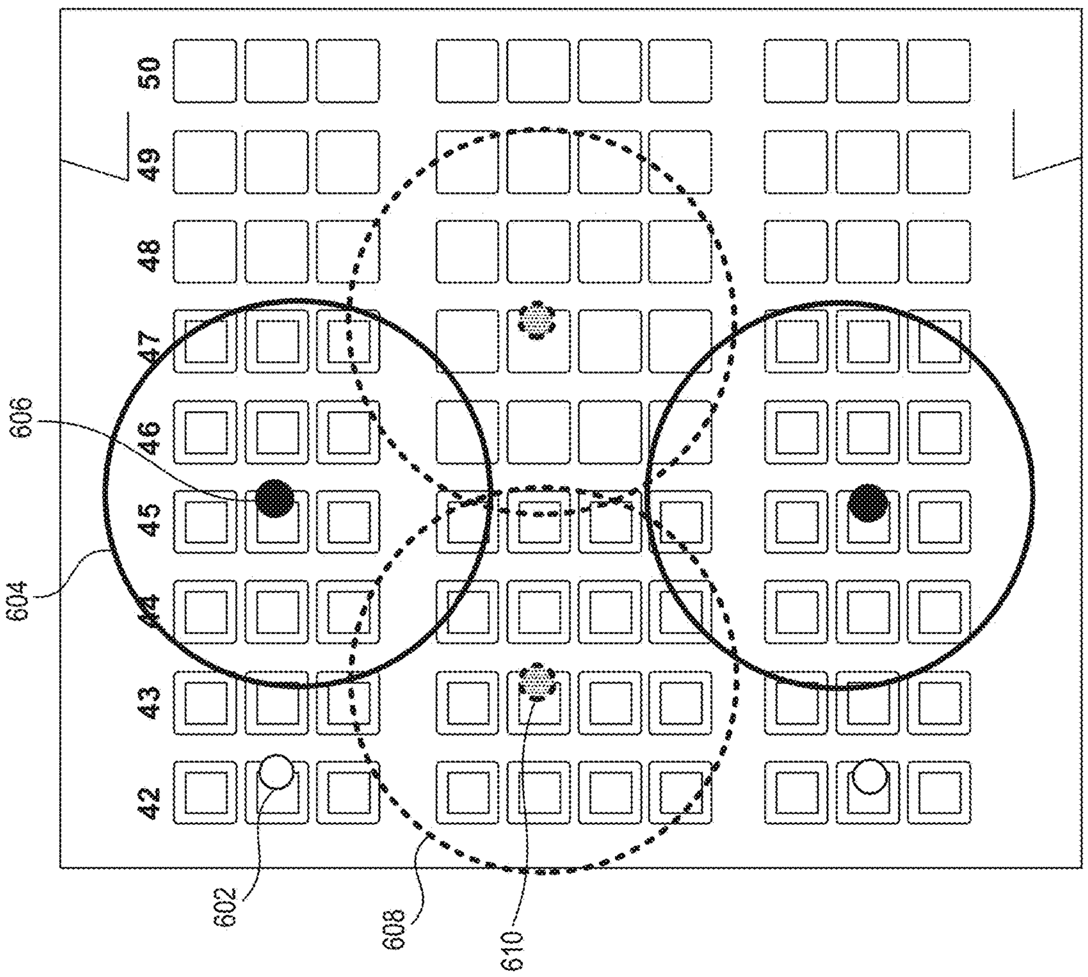
FIGS. 6-8 illustrate example views of localized wireless network zones created by utilizing media playback devices based on some implementations of the disclosed technology.
Figure 7:
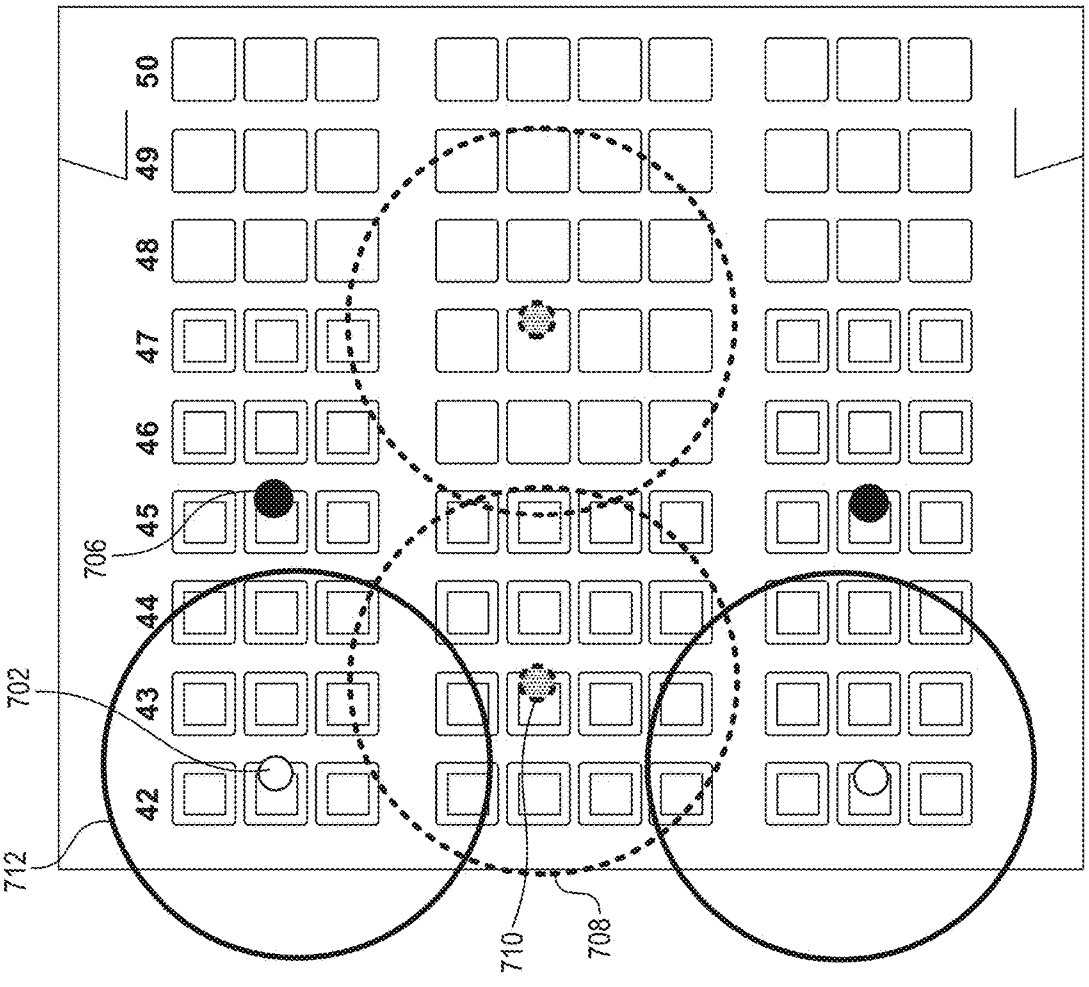
Figure 8:
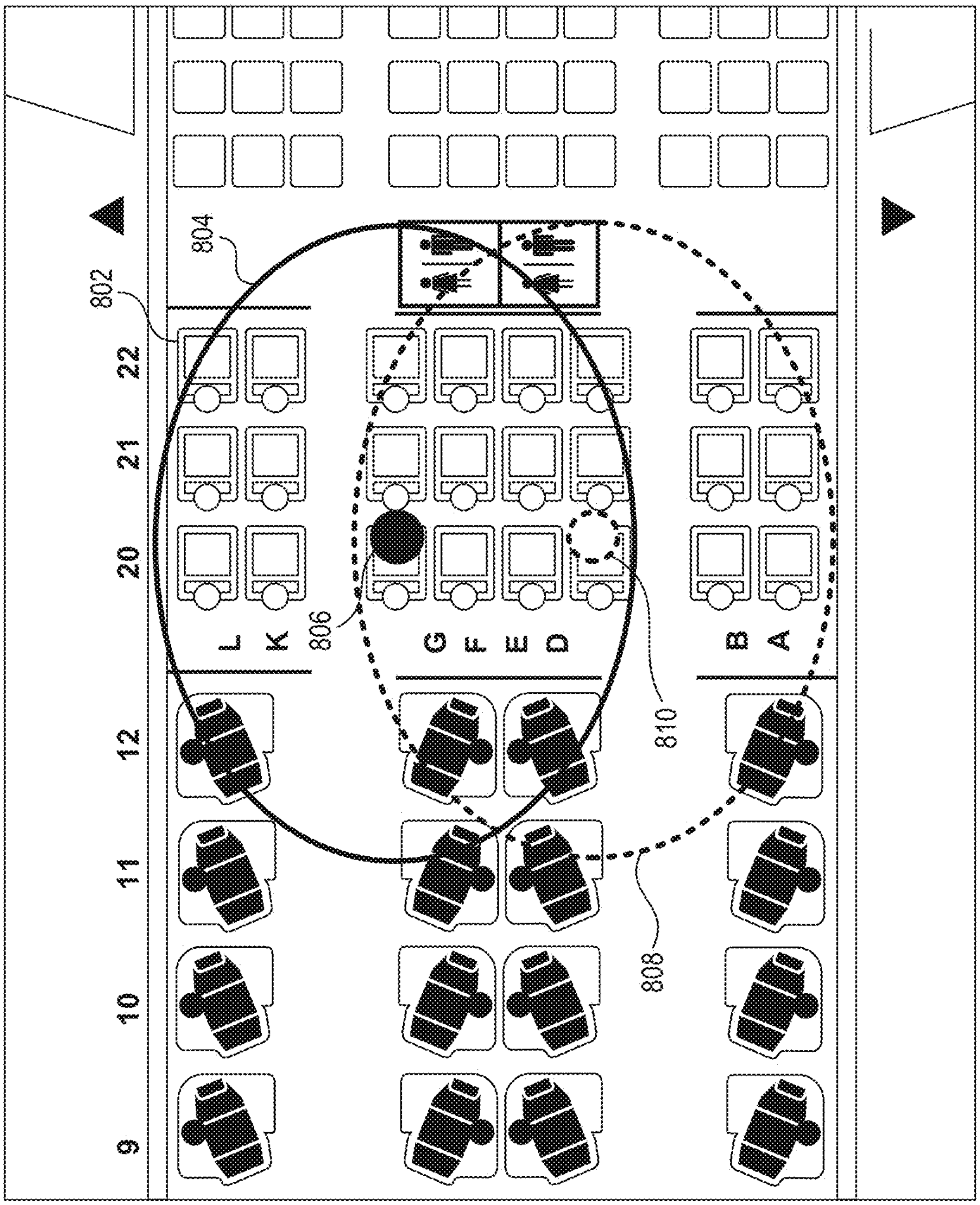

FIGS. 6 to 8 illustrate example views of localized wireless network zones created by utilizing media playback devices based on some implementations of the disclosed technology. FIG. 6 illustrates the localized wireless network zones 604 and 608 created by the media playback devices 606 and 610, respectively. In FIG. 6, the seat hotspot of the media playback device 602 is turned off and thus no wireless network zone is provided by the media playback device 602. FIG. 7 illustrates the localized wireless network zones 708 and 712 created by the media playback devices 710 and 702, respectively. Although the wireless network zones 604, 608, 708, 712 are shown with a circle pattern, those skilled in the art would understand that the actual signal may have other shapes, e.g., a conical pattern. Unlike FIG. 6, in FIG. 7, the seat hotspot of the media playback device 702 is turned on and the wireless network zone 712 is provided by the media playback device 702. FIG. 8 shows another example view of localized wireless network zones that are provided by utilizing media playback devices. In FIG. 8, the wireless network zones 802 and 808 are provided by the media playback devices 806 and 810, respectively. In the example of FIG. 8, while the media playback devices 806 and 810 are associated with the economy class seats, the wireless network zones 802 and 808 provided from the media playback devices 806 and 810 reach to some areas of the premium class seats. In some implementations, it is possible to design the wireless network zones available on passenger seats of a certain type by utilizing media playback devices provided on seats of a different type.

Figure 9:
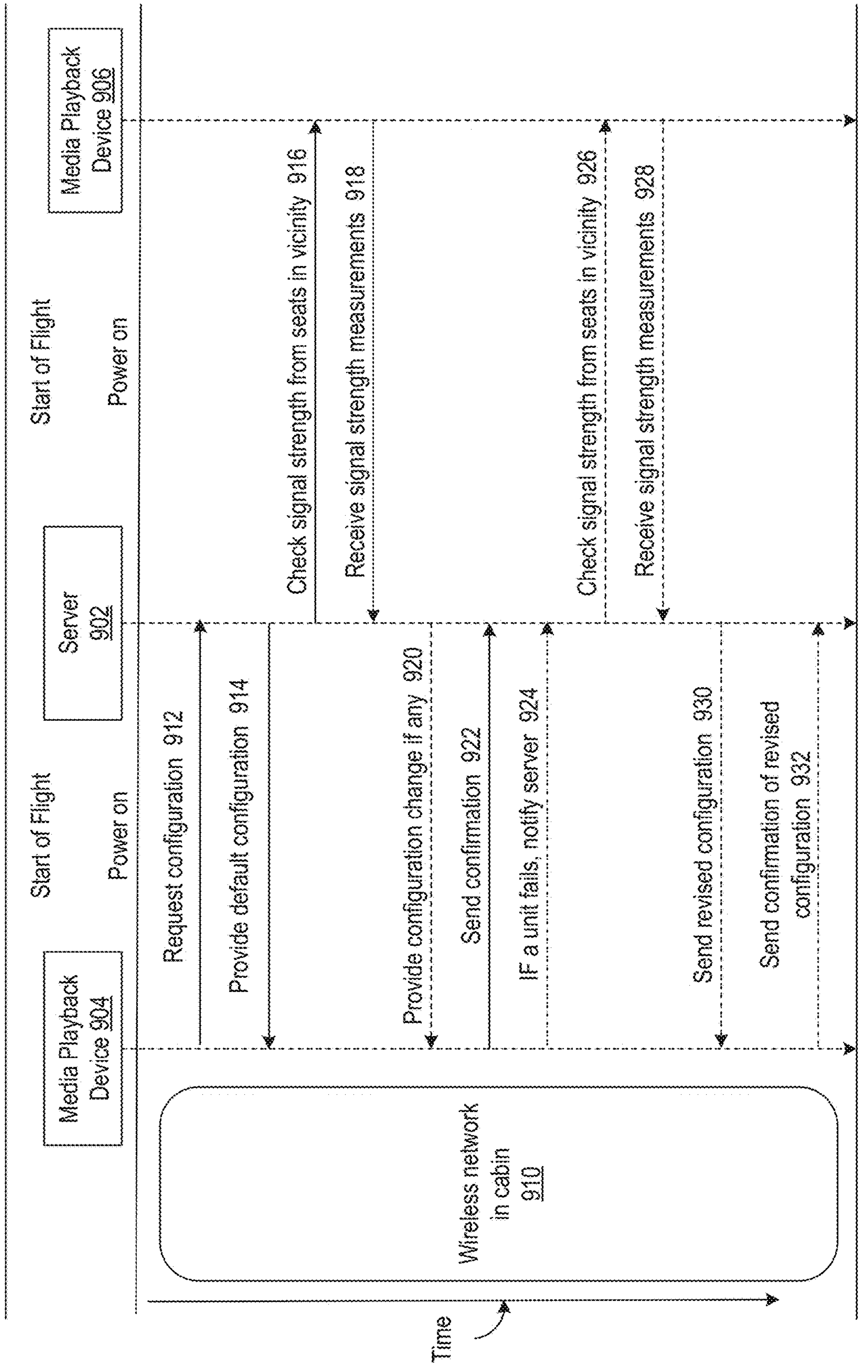
FIG. 9 shows an example flowchart of operations in case of an occurrence of any connection failures of a media playback device based on some implementations of the disclosed technology.

FIG. 9 shows an example flowchart of operations in case of an occurrence of any connection failures of a media playback device based on some implementations of the disclosed technology. The connection failure refers to a status of the media playback device that is not able to operate as a seat hotspot and may be caused due to an error of any components of a wireless module of the media playback device. The process as shown in FIG. 9 is performed after the start of a flight.

With the start of the flight, at operation 912, the configuration request can be made from the media playback device 904 associated with a first seat to the server 902. In response to the configuration request, at operation 914, the server 902 provides a default configuration to the media playback device 904. The default configuration for the media playback device 904 may be same as the initial configuration or different from the initial configuration. The default configuration is predetermined and stored on the server 902. At operation 916, the server 902 checks the signal strength measurements of the wireless connection with a media playback device 906 provided on a second seat located in the vicinity of the first seat. In response to receiving the request from the server 902, at operation 918, the media playback device 906 reports, to the server 902, the signal strength measurements. The server 902 evaluates the data from the media playback device 906 and calculates the configuration changes based on the evaluation. At operation 920, the server 902 provides, to the media playback device 904, the configuration changes. At operation 922, the media playback device sends a confirmation of the receipt of the configuration changes.

It is assumed that a connection failure of the media playback device 904 occurs. At operation 924, the media playback device 904 reports, to the server 902, the connection failure. At operation 926, the server 902 checks the signal strength with the media playback device 906 provided on the second seat. In response to receiving the request from the server 902, at operation 928, the media playback device 904 reports, to the server 902, the signal strength measurements. Based on the report from the media playback device 904, the server 902 determines the revised configuration for the media playback device 904. At operation 930, the server 902 provides, to the media playback device 904, the revised transmission configuration. At operation 932, the media playback device 904 reports, to the server 902, the confirmation of the revised configuration. In the implementations, the revised configuration provided from the server 902 to the media playback device 904 may include changing of the transmission signal of the media playback device 904. In some implementations, the revised configuration provided from the server 902 to the media playback device 904 may include turning off the seat hotspot of the media playback device 904 having the connection failure. In some implementations, although not shown in FIG. 9, the server 902 may instruct one or more additional media playback devices that are located in the vicinity of the media playback device 904 to turn on the seat hotspots and/or increase the transmission signals.

Figure 10:
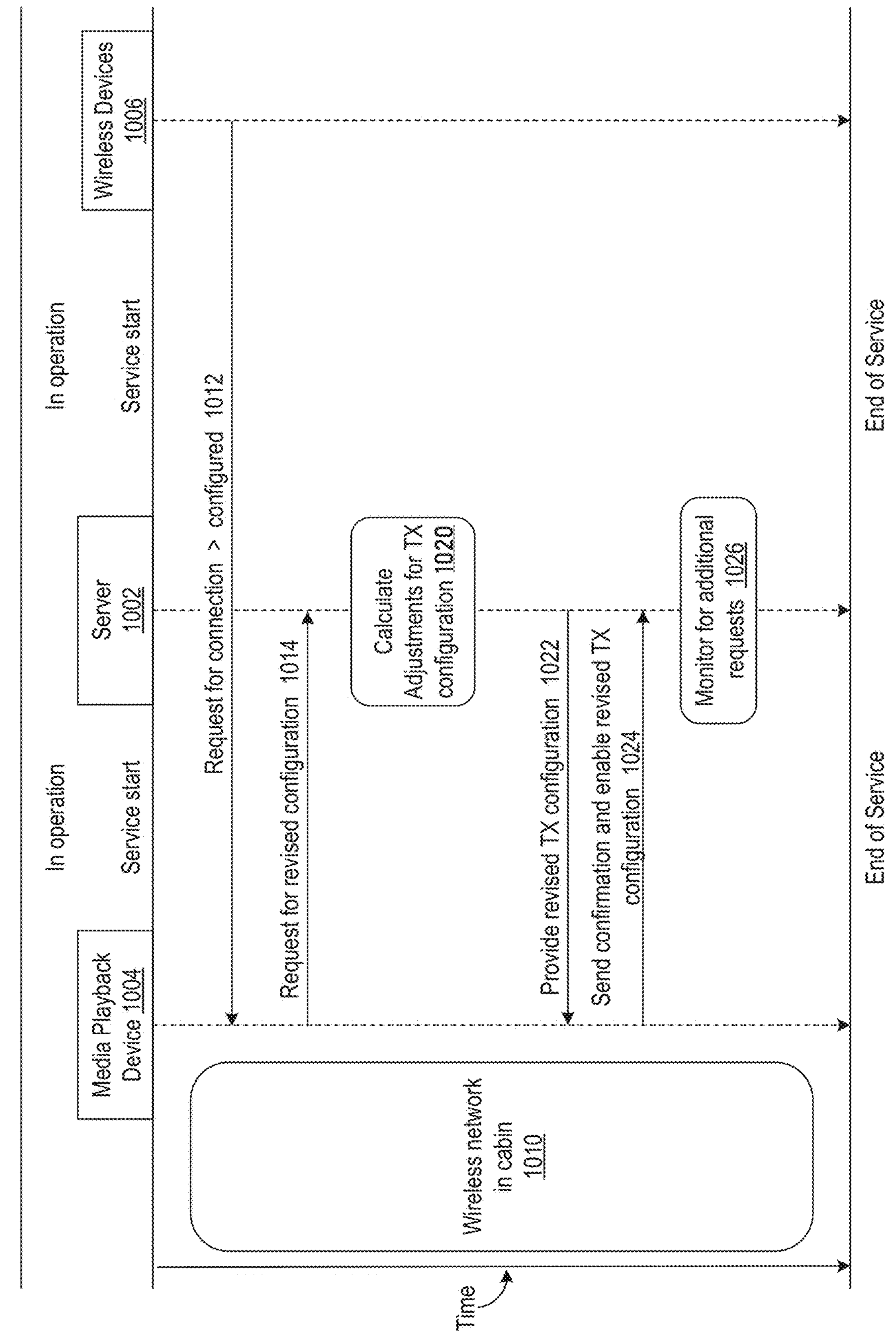
FIG. 10 shows an example flowchart of operations for providing additional coverage of wireless connections based on some implementations of the disclosed technology.

FIG. 10 shows an example flowchart of operations for providing additional coverage (e.g., slots) for wireless connections by utilizing media playback devices based on some implementations of the disclosed technology. At operation 1012, a wireless device 1006 (e.g., laptop, headset, keyboard, mouse, display, etc.) sends a request for the wireless connection to a media playback device 1004. At operation 1914, the media playback device 1004 sends a request for a revised configuration to a server 1002. At operation 1020, the server 1002 calculates adjustments for the transmission (TX) configuration. At operation 1022, the server 1002 provides the revised transmission (TX) configuration to the media playback device 1004. At operation 1024, the media playback device 1004 sends the confirmation of the revised RX configuration. At operation 1026, the server 1002 monitors for additional connection requests.

In the example as shown in FIG. 10, in response to the request for the wireless connection from the media playback device, the server sends the adjustments for the transmission (TX) configuration. In some implementations, after receiving the request for the wireless connection from the media playback device 1004, the server may check whether to turn on the hotspot of any additional media playback device located near the media playback device 1004. The server 1002 may run an algorithm to determine whether to turn on the hotspot of the additional media playback device. By turning on the seat hotspots of the media playback devices located in the vicinity of the media playback devices, it is possible to add more available slots in the cabin when there are more depends for the wireless connections. In some implementations, in response to the request for the wireless connection from the media playback device 1004, the server 1002 can determine do both i) calculating the adjustments for TX configuration and ii) turning on the seat hotspot of any additional media playback device disposed near the media playback device 1004.

The implementations of the disclosed technology allow to change the wireless network configuration in the cabin during the flight based on the demands for wireless connections in the cabin. When there are more demands for the wireless connections from the wireless devices in the cabin, some implementations suggest turning on more seat hotspots of the media playback devices provided on the corresponding passenger seats. The IFE system monitors the wireless usage in the cabin and the demands for the additional wireless connections, and can determine which media playback devices are to be enabled to operate as seat hotspots. In some implementations, the IFE system can determine to adjust the transmission (TX) configuration by increasing the transmission (TX) signal to provide additional coverage. When there are less demands for the wireless connections in the cabin, the IFE system can determine which media playback devices turn off the seat hotspots. In some implementation, the IFE system can determine to adjust transmission (TX) configuration by decreasing the transmission (TX) signal to reduce the signal overlapping and interferences. The server may store the predetermined algorithms to determine to increase or decrease the transmission (TX) signal and identify media playback devices whose seat hotspots are to be enabled or disabled based on the location of the wireless devices which need wireless connections and the wireless devices which do not need wireless connections.

Figure 11:
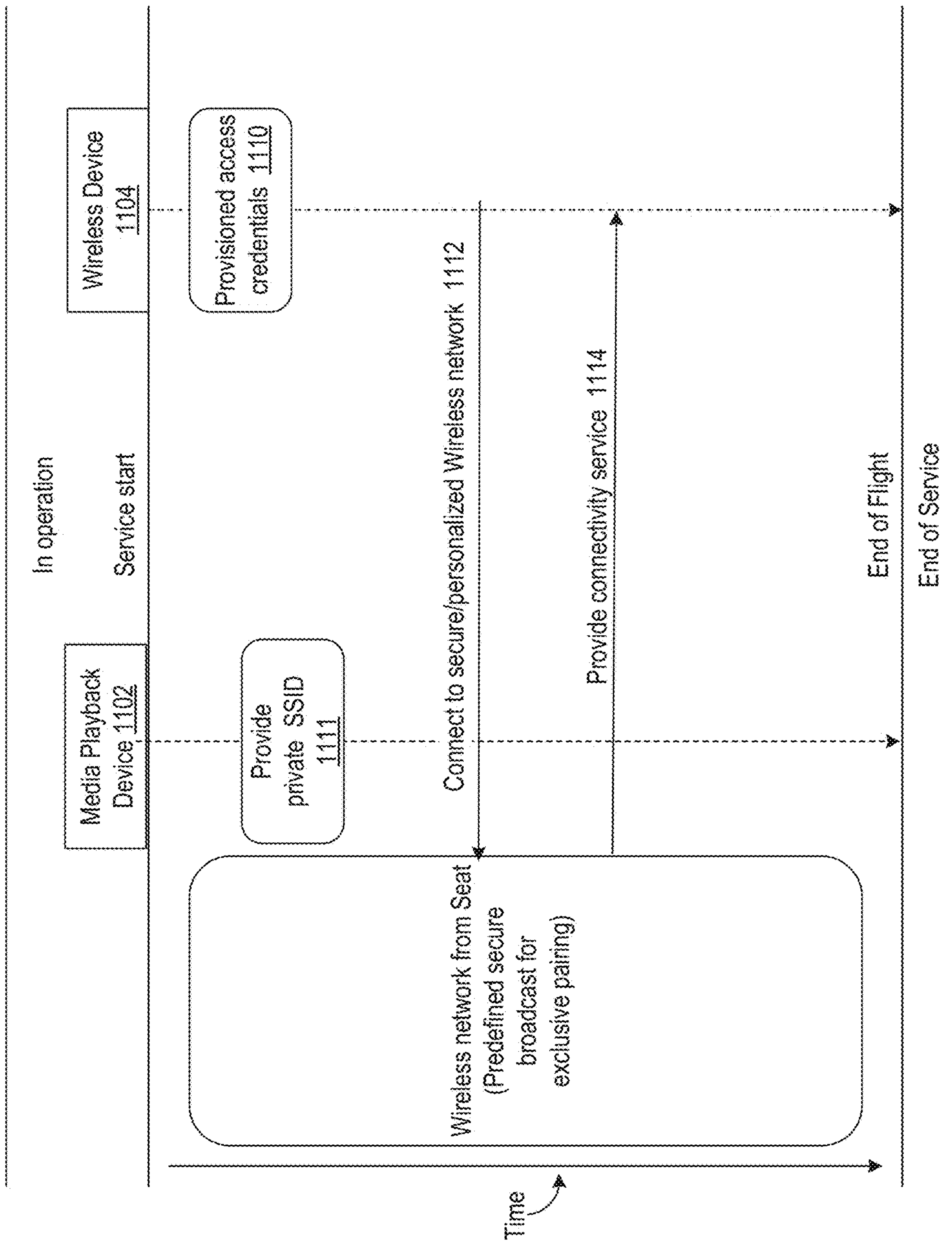
FIG. 11 shows an example of operations of creating a personalized wireless network zone for a passenger based on some implementations of the disclosed technology.

FIG. 11 shows an example of operations of creating a personalized wireless network zone for a passenger based on some implementations of the disclosed technology. In some implementation, when there is a request for wireless connection, the server checks whether the request meets one of the predetermined conditions and instructs a corresponding media playback deice to create a personalized wireless network zone. The predetermined conditions can be set in various manners. For example, the predetermined conditions can be met when the request for the wireless connection is from a passenger on a passenger seat of a certain type (e.g., first class or premium class), when a passenger makes payments for the use of the personalized wireless network zone, or others.

At operation 1110, the wireless device 1104 of a passenger on a passenger seat provisions the access credentials. The IFE system can obtain the passenger's information, which is used for the access credentials, in various manners. The passenger information can be used to check whether the request from the wireless device 1104 meets the predetermined conditions to provide a personalized wireless network zone. The passenger information may correspond to the passenger identification information assigned to each passenger and can be implemented in various manners such as QR codes, bar codes, patterns, characters, symbols, or others, which may be referred to as the passenger codes in the description below. In some implementations, the media playback device 1102 associated with the passenger may detect and capture the optically readable passenger codes (e.g., QR code or bar code) included in a passenger ticket or stored in the wireless device 1104 of the passenger. For example, the media playback device 1102 is equipped with an imaging device (e.g., camera) for reading the passenger codes. If the passenger locates the physical passenger ticket or the electronic passenger ticket stored on the passenger's wireless device 1104 in a reading area of the imaging device of the media playback device 1102, the imaging device can scan the passenger codes present on the physical or electronic passenger ticket. In some implementations, the passenger may use the imaging device (e.g., camera) of the passenger's wireless device 1104 to read the passenger codes on the passenger ticket and send the passenger codes to the media playback device 1102 through the wireless connection that is initially provided to the passenger. In some other implementations, the media playback device 1102 can receive the passenger codes of the passenger without any scanning operation. For example, the passenger's wireless device 1104 has a software application configured to program the wireless device 1104 to pair with the IFE system and provide the passenger codes stored on the wireless device 1104 to the media playback device 1102 through the wireless connection. In some other implementations, the passenger can enter the passenger codes using the touch screen provided on the media playback device 1102. In some implementations, a passenger may request a crew terminal for a personalized localized network zone and the crew terminal can send the request to the server on behalf of the passenger.

When the request from the wireless device 1104 meets the predetermined conditions, the server instructs the media playback device 1102 to turn on the seat hotspot of the media playback device 1102 to create a personalized wireless network zone. The server of the IFE system stores an algorithm to create a SSID associated with the personalized wireless network zone, assign bandwidth corresponding to the SSID, and manage the SSID. In some implementations, the IFE system can dynamically determine the bandwidth of the personalized network zone based on factors, e.g., the availability of resources, the number of requests for the personalized wireless network zones, policy of the airplane, etc. In some implementations, the IFE system can run the bandwidth control to optimize the use of the available resources in the airplane. In the example, the IFE system can create and configure a table that stores information (start time for use, an assigned bandwidth, a desired time duration for use, etc.) of each personalized wireless network zones. The IFE system can communicate with the ground server to process the request to create the SSID and manage the SSID.

At operation 1111, the media playback device 1102 provides a private SSID (service set identifier) for a passenger. This private SSID is for the passenger only and can be hidden without being broadcast to other passengers in the airplane, which allows to provide an improved security. In the implementation, the media playback device 1102 can display a message, e.g., "Please accept an invitation to your personal wireless network" with the private SSID. This display of the message can notify the passenger that the personalized wireless network zone is created. In the example, the SSID is provided to the passenger by displaying it on the media playback device 1102 but other implementations are also possible. In the example, the SSID can be provided to the airline software application running on the wireless device of the passenger.

At operation 1112, the wireless device 1104 is connected to the personalized wireless network. At operation 1114, the connectivity service is provided. The personalized wireless network allows the passenger to be connected to a predefined secure channel for the wireless connections and the SSID associated with the personalized wireless network can be hidden. Airlines can provide various options for passengers for the wireless connection services and can create more revenues by, for example, charging additional payments for the personalized wireless network service.

Various implementations of the disclosed technology suggest providing the wireless connectivity within a vehicle by utilizing media playback devices as seat hotspots creating localized wireless network zones. With the suggested implementations, it is possible to provide more flexible and adaptable solutions for the network layout. In some implementations, the suggested techniques to operate media playback devices as the seat hotspots may work together with WAPs that are installed on the airplane. For example, the IFE system can monitor the operations of the WAPs and turn on the seat hotspots of the media playback devices when a WAP fails in the corresponding area. For example, the IFE system can detect the failure of the WAPs and in response to the detection of the failure of a WAP covering particular passenger seats, the IFE system can send the instruction to the media playback devices associated with the particular passenger seats to turn on the seat hotspots. With the implementations, it is still possible to provide the wireless coverages to the passengers assigned to the passenger seats covered by a WAP regardless of a failure of the WAP. The utilization of the media playback devices as hotspots for the wireless connections can expand to the scenario when all WAPs fail or suffer a break in the connection or any other circumstances.

Various techniques preferably incorporated within some embodiments may be described using the following solution-based format.

1. A system for creating a localized wireless network zone for a passenger on a commercial passenger vehicle, comprising: a first media playback device and a second media playback device that are respectively disposed on a first passenger seat and a second passenger seat in the commercial passenger vehicle, each of the first media playback device and the second media playback device operable as a seat hotspot by creating a localized wireless network zone covering passenger seats located in a vicinity of the first passenger seat and the second passenger seat, respectively; an onboard server communicatively coupled to the first media playback device and the second media playback device and configured to monitor a number of requests for a wireless connection in the commercial passenger vehicle and control at least one of the first media playback device and the second media playback device to turn on the seat hotspot based on a result of the monitoring.

2. The system of solution 1, wherein the onboard server is further configured to control the second media playback device to turn off the seat hotspot based on the number of requests for the wireless connection in the commercial passenger vehicle.

3. The system of solution 1, wherein the onboard server is further configured to determine to turn on the first media playback device based on a location of a request for the wireless connection.

4. The system of solution 1, wherein each of the first media playback device and the second media playback device has an initial transmission configuration that is set up by an initial configuration process performed before a trip of the commercial passenger vehicle.

5. The system of solution 1, wherein the onboard server is further configured to receive feedback data including signal strength measurements of the wireless connection from media playback devices disposed on passenger seats located in a vicinity of the first passenger seat.

6. The system of solution 5, wherein the onboard server is further configured to, based on the feedback data, at least one of adjust a transmission signal of the first media playback device or turn on a seat hotspot of another media playback device.

7. The system of solution 5, wherein the onboard server is configured to run a machine learning algorithm that is designed to evaluate the feedback data and determine a revised configuration for the first media playback device.

8. The system of solution 1, wherein the second media playback device disposed on the second passenger seat satisfying a predetermined condition is configured to provide a SSID (service set identifier) for the wireless connection, the SSID being a personalized identifier for a passenger on the second passenger seat and hidden without being broadcast to other passengers.

9. The system of solution 8, wherein the predetermined condition is satisfied when the second passenger seat is of a predetermined type or a request for the SSID is received from the second passenger seat.

10. The system of solution 8, wherein the second media playback device is configured to receive passenger identification information of the passenger by capturing an image of the passenger identification information included in a boarding pass of the passenger or stored on a passenger electronic device associated with the passenger.

11. The system of solution 8, wherein the onboard server is further configured to create the SSID and assign a bandwidth to a network associated with the SSID.

12. The system of solution 1, wherein the localized wireless network zone has a size that is adjustable based on a wireless usage on the commercial passenger vehicle.

Figure 12:
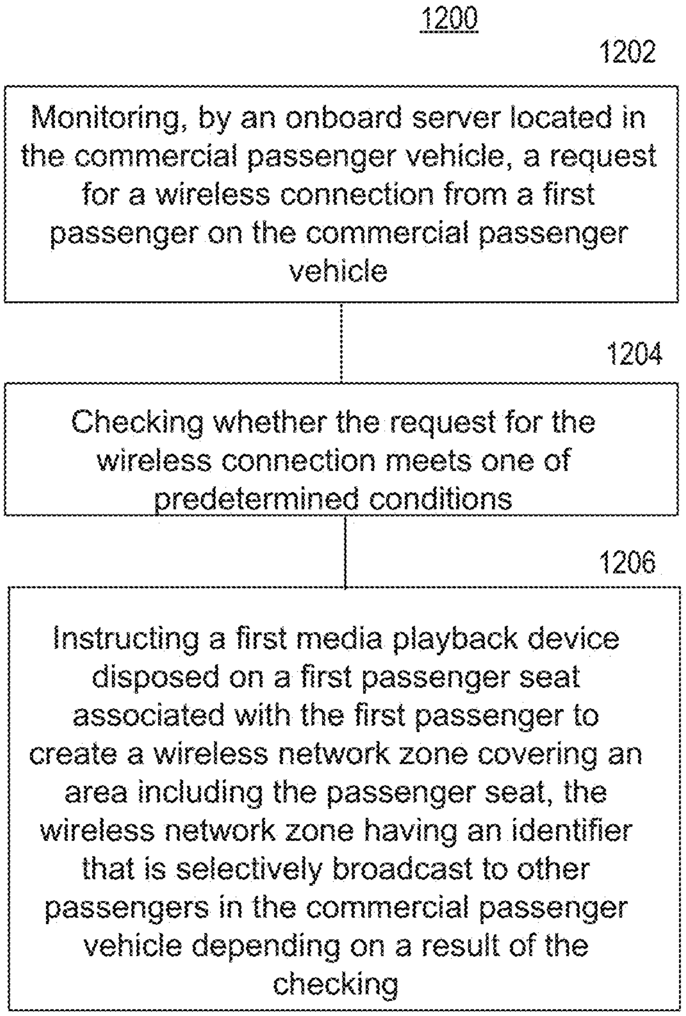
FIG. 12 shows an example flowchart of a method for creating a localized wireless network zone for a passenger on a commercial passenger vehicle based on some implementations of the disclosed technology.

13. A method (method 1200 as shown in FIG. 12) for creating a localized wireless network zone for a passenger on a commercial passenger vehicle, comprising: monitoring 1202, by an onboard server located in the commercial passenger vehicle, a request for a wireless connection from a first passenger on the commercial passenger vehicle; checking 1204 whether the request for the wireless connection meets one of predetermined conditions; and instructing 1206 a first media playback device disposed on a first passenger seat associated with the first passenger to create a wireless network zone covering an area including the passenger seat, the wireless network zone having an identifier that is selectively broadcast to other passengers in the commercial passenger vehicle depending on a result of the checking.

14. The method of solution 13, further comprising: monitoring, by the onboard server, a usage of resources for the wireless connection in the commercial passenger vehicle; and instructing, based on a result of the monitoring, a second media playback device disposed on a second passenger seat associated with a second passenger to turn off a seat hotspot of the second media playback device.

15. The method of solution 13, wherein the checking includes: checking a type of the first passenger seat or checking whether a payment for the request has been received from the first passenger.

16. The method of solution 13, wherein the instructing the first media playback device includes: creating a service set identifier (SSID) for the first passenger when the request for the wireless connection meets one of the predetermined conditions.

17. The method of solution 13, further comprising: performing an initial configuration process before a start of a flight to set up a transmission configuration of the first media playback device.

18. The method of solution 17, further comprising: receiving, from media playback devices disposed in a vicinity of the first passenger seat, feedback data including signal strength measurements of the wireless connection.

19. The method of solution 18, further comprising: adjusting the transmission configuration of the first media playback device based on the feedback data or turning on a seat hotspot of another media playback device based on the feedback data.

20. The method of solution 19, further comprising: applying a machine learning algorithm to evaluate the feedback data and determine adjustments of the transmission configuration of the first media playback device.

21. A computer readable medium storing instructions, upon execution by a processor, causing the processor to implement a method comprising: monitoring, by an onboard server located in the commercial passenger vehicle, a request for a wireless connection from a first passenger on the commercial passenger vehicle; checking whether the request for the wireless connection meets one of predetermined conditions; and instructing a first media playback device disposed on a first passenger seat associated with the first passenger to create a wireless network zone covering an area including the passenger seat, the wireless network zone having an identifier that is selectively broadcast to other passengers in the commercial passenger vehicle depending on a result of the checking.

22. The computer readable medium of solution 21, wherein the method further comprises: monitoring, by the onboard server, a usage of resources for the wireless connection in the commercial passenger vehicle; and instructing, based on a result of the monitoring, a second media playback device disposed on a second passenger seat associated with a second passenger to turn off a seat hotspot of the second media playback device.

23. The computer readable medium of solution 21, wherein the checking includes: checking a type of the first passenger seat or checking whether a payment for the request has been received from the first passenger.

24. The method of solution 21, wherein the instructing the first media playback device includes:

In some implementations, the machine learning/AI applications may compile coded descriptions into lower-level structured data objects that a machine can more readily understand, build a network topology of the main problem concept and sub-concepts covering aspects of the problem to be solved, train codified instantiations of the sub-concepts and main concept, and execute a trained AI model containing one, two, or more neural networks. The machine learning/AI applications can abstract away and automate the low-level mechanics of AI, and the machine learning/AI applications can manage and automate much of the lower-level complexities of working with AI. Each program developed in a pedagogical programming language can be fed into the machine learning/AI applications to generate and train appropriate intelligence models. The machine learning/AI applications can be a cloud-hosted platform configured to manage complexities inherent to training AI networks. Thus, the machine learning/AI applications can be accessible with one or more client-side interfaces to allow third parties to submit a description of a problem in a pedagogical programming language and let the online AI engine build and generate a trained intelligence model for one or more of the third parties. In some implementations, the machine learning/AI applications can be employed to algorithms, e.g., evaluating feedback data from media playback devices associated with passenger seats for an initial cabin configuration and/or a cabin configuring during a flight, setting, determining power levels adjustments of the wireless modules of the media playback devices for an initial cabin configuration and/or a cabin configuring during a flight, assigning bandwidth to each personalized wireless network, performing the bandwidth control to optimize the use of the available resources in the airplane.

Some of the embodiments described herein are described in the general context of methods or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Therefore, the computer-readable media can include a non-transitory storage media. Generally, program modules may include routines, programs, objects, components, data structures, etc. that perform particular tasks or implement particular abstract data types. Computer- or processor-executable instructions, associated data structures, and program modules represent examples of program code for executing steps of the methods disclosed herein. The particular sequence of such executable instructions or associated data structures represents examples of corresponding acts for implementing the functions described in such steps or processes.

Some of the disclosed embodiments can be implemented as devices or modules using hardware circuits, software, or combinations thereof. For example, a hardware circuit implementation can include discrete analog and/or digital components that are, for example, integrated as part of a printed circuit board. Alternatively, or additionally, the disclosed components or modules can be implemented as an Application Specific Integrated Circuit (ASIC) and/or as a Field Programmable Gate Array (FPGA) device. Some implementations may additionally or alternatively include a digital signal processor (DSP) that is a specialized microprocessor with an architecture optimized for the operational needs of digital signal processing associated with the disclosed functionalities of this application. Similarly, the various components or sub-components within each module may be implemented in software, hardware or firmware. The connectivity between the modules and/or components within the modules may be provided using any one of the connectivity methods and media that is known in the art, including, but not limited to, communications over the Internet, wired, or wireless networks using the appropriate protocols.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few implementations and examples are described and other implementations, enhancements and variations can be made based on what is described and illustrated in this patent document.

What is claimed is:

1. A method for creating a localized wireless network zone for a passenger on a commercial passenger vehicle, comprising:

monitoring, by an onboard server located in the commercial passenger vehicle, a request for a wireless connection from a first passenger on the commercial passenger vehicle;

checking whether the request for the wireless connection meets one of predetermined conditions; and instructing a first media playback device disposed on a first passenger seat associated with the first passenger to create a wireless network zone covering an area including the first passenger seat, the wireless network zone having an identifier that is selectively broadcast to other passengers in the commercial passenger vehicle depending on a result of the checking.

2. The method of claim 1, further comprising:

monitoring, by the onboard server, a usage of resources for the wireless connection in the commercial passenger vehicle; and instructing, based on a result of the monitoring, a second media playback device disposed on a second passenger seat associated with a second passenger to turn off a seat hotspot of the second media playback device.

3. The method of claim 1, wherein the checking includes:

checking a type of the first passenger seat, or checking whether a payment for the request has been received from the first passenger.

4. The method of claim 1, wherein the instructing the first media playback device includes:

creating the identifier that is provided to the first passenger only and not broadcast to the other passengers when the request for the wireless connection meets one of the predetermined conditions.

5. The method of claim 1, further comprising:

performing an initial configuration process before a start of a flight to set up a transmission configuration of the first media playback device, receiving, from media playback devices disposed in a vicinity of the first passenger seat, feedback data including signal strength measurements of the wireless connection, and adjusting the transmission configuration of the first media playback device based on the feedback data or turning on a seat hotspot of another media playback device based on the feedback data.

6. The method of claim 1, wherein the method instructs the first media playback device to create the wireless network zone through which a personal electronic device of the first passenger is connected to a wireless network within the commercial passenger vehicle without using any wireless access points disposed in the commercial passenger vehicle.

7. The method of claim 1, wherein the predetermined conditions are satisfied when the first media playback device disposed on the first passenger seat associated with the first passenger is of a predetermined type or the request is received.

8. A non-transitory computer readable medium storing instructions which, upon execution by a processor, cause the processor to implement a method comprising:

monitoring, by an onboard server located in a commercial passenger vehicle, a request for a wireless connection from a first passenger on the commercial passenger vehicle;

checking whether the request for the wireless connection meets one of predetermined conditions; and instructing a first media playback device disposed on a first passenger seat associated with the first passenger to create a wireless network zone covering an area including the first passenger seat, the wireless network zone having an identifier that is selectively broadcast to other passengers in the commercial passenger vehicle depending on a result of the checking.

9. The non-transitory computer readable medium of claim 8, wherein the method further comprises:

monitoring, by the onboard server, a usage of resources for the wireless connection in the commercial passenger vehicle; and instructing, based on a result of the monitoring, a second media playback device disposed on a second passenger seat associated with a second passenger to turn off a seat hotspot of the second media playback device.

10. The non-transitory computer readable medium of claim 8, wherein the checking includes:

checking a type of the first passenger seat, or checking whether a payment for the request has been received from the first passenger.

11. The non-transitory computer readable medium of claim 8, wherein the instructing the first media playback device includes:

creating the identifier that is provided to the first passenger only and not broadcast to the other passengers when the request for the wireless connection meets one of the predetermined conditions.

12. The non-transitory computer readable medium of claim 8, wherein the method further comprises:

performing an initial configuration process before a start of a flight to set up a transmission configuration of the first media playback device, receiving, from media playback devices disposed in a vicinity of the first passenger seat, feedback data including signal strength measurements of the wireless connection, and adjusting the transmission configuration of the first media playback device based on the feedback data or turning on a seat hotspot of another media playback device based on the feedback data.

13. The non-transitory computer readable medium of claim 8, wherein the method instructs the first media playback device to create the wireless network zone through which a personal electronic device of the first passenger is connected to a wireless network within the commercial passenger vehicle without using any wireless access points disposed in the commercial passenger vehicle.

14. An apparatus for creating a localized wireless network zone for a passenger on a commercial passenger vehicle, the apparatus located in a commercial passenger vehicle and configured to:

monitor a request for a wireless connection from a first passenger on the commercial passenger vehicle;

check whether the request for the wireless connection meets one of predetermined conditions; and instruct a first media playback device disposed on a first passenger seat associated with the first passenger to create a wireless network zone covering an area including the first passenger seat, the wireless network zone having an identifier that is selectively broadcast to other passengers in the commercial passenger vehicle depending on a result of the checking.

15. The apparatus of claim 14, wherein the apparatus is further configured to:

monitor a usage of resources for the wireless connection in the commercial passenger vehicle; and instruct, based on a result of the monitoring, a second media playback device disposed on a second passenger seat associated with a second passenger to turn off a seat hotspot of the second media playback device.

16. The apparatus of claim 14, wherein the apparatus is further configured to:

check a type of the first passenger seat, or check whether a payment for the request has been received from the first passenger.

17. The apparatus of claim 14, wherein the apparatus is further configured create the identifier that is provided to the first passenger only and not broadcast to the other passengers when the request for the wireless connection meets one of the predetermined conditions.

18. The apparatus of claim 14, wherein the apparatus is further configured to:

perform an initial configuration process before a start of a flight to set up a transmission configuration of the first media playback device, receive, from media playback devices disposed in a vicinity of the first passenger seat, feedback data including signal strength measurements of the wireless connection, and adjust the transmission configuration of the first media playback device based on the feedback data or turning on a seat hotspot of another media playback device based on the feedback data.

19. The apparatus of claim 14, wherein the apparatus is configured to instruct the first media playback device to create the wireless network zone through which a personal electronic device of the first passenger is connected to a wireless network within the commercial passenger vehicle without using any wireless access points disposed in the commercial passenger vehicle.

20. The apparatus of claim 14, wherein the predetermined conditions are satisfied when the first media playback device disposed on the first passenger seat associated with the first passenger is of a predetermined type or the request is received.

* * * * *